(12) United States Patent
Nystad

(10) Patent No.: US 8,044,971 B2
(45) Date of Patent: Oct. 25, 2011

(54) METHODS OF AND APPARATUS FOR PROCESSING COMPUTER GRAPHICS

(75) Inventor: Jørn Nystad, Trondheim (NO)

(73) Assignee: ARM Norway AS, Trondheim (NO)

( * ) Notice: Subject to any disclaimer, the term of this patent is extended or adjusted under 35 U.S.C. 154(b) by 785 days.

(21) Appl. No.: 12/068,001

(22) Filed: Jan. 31, 2008

(65) Prior Publication Data

US 2009/0195552 A1    Aug. 6, 2009

(51) Int. Cl.
*G09G 5/00* (2006.01)
*G09G 5/02* (2006.01)

(52) U.S. Cl. ....................... 345/614; 345/589

(58) Field of Classification Search ................. 345/611, 345/613, 614, 589
See application file for complete search history.

(56) References Cited

U.S. PATENT DOCUMENTS

| | | | |
|---|---|---|---|
| 5,016,169 A | 5/1991 | Koya et al. | |
| 5,644,752 A | 7/1997 | Cohen et al. | |
| 5,929,862 A | 7/1999 | Barkans | |
| 6,052,129 A | 4/2000 | Fowler et al. | |
| 6,057,855 A | 5/2000 | Barkans | |
| 6,128,000 A | 10/2000 | Jouppi et al. | |
| 6,216,200 B1 | 4/2001 | Yeager | |
| 6,259,460 B1 | 7/2001 | Gossett et al. | |
| 6,260,131 B1 | 7/2001 | Kikuta et al. | |
| 6,424,343 B1 | 7/2002 | Deering et al. | |
| 6,424,345 B1 | 7/2002 | Smith et al. | |
| 6,504,542 B1 | 1/2003 | Voorhies et al. | |
| 6,633,297 B2 | 10/2003 | McCormack et al. | |
| 6,650,325 B1 | 11/2003 | Voorhies et al. | |
| 6,650,333 B1 | 11/2003 | Baldwin | |
| 6,697,063 B1 | 2/2004 | Zhu | |
| 6,720,975 B1 | 4/2004 | Dietrich et al. | |
| 6,766,410 B1 | 7/2004 | Carlton | |
| 6,967,663 B1 | 11/2005 | Bastos et al. | |
| 6,999,100 B1 | 2/2006 | Leather et al. | |
| 7,170,515 B1 | 1/2007 | Zhu | |
| 7,184,041 B2 | 2/2007 | Heng et al. | |
| 7,454,590 B2 | 11/2008 | Jordan et al. | |
| 7,554,538 B2 | 6/2009 | Wexler et al. | |
| 7,656,417 B2 | 2/2010 | Seiler et al. | |
| 7,692,654 B1 | 4/2010 | Donham | |
| 7,774,531 B1 | 8/2010 | Karlsson | |

(Continued)

FOREIGN PATENT DOCUMENTS

EP  0 652 644 A2  10/1994

(Continued)

OTHER PUBLICATIONS

UK Search Report dated Jan. 30, 2009 for GB 0819570.3.

(Continued)

*Primary Examiner* — Ryan R Yang
(74) *Attorney, Agent, or Firm* — Nixon & Vanderhye P.C.

(57) ABSTRACT

When an alpha test is performed as part of the rendering process in a multisampled graphics processing pipeline, rather than taking the single alpha value initially defined for each fragment an individual alpha value is generated in respect of each of covered sampling position that the fragment in question is being used to render. The individual alpha values estimated for each sample position are then individually compared with a threshold alpha value defined for the alpha test, and the result of this alpha test comparison is used to decide either keep or discard the sample position from further processing.

24 Claims, 6 Drawing Sheets

U.S. PATENT DOCUMENTS

| | | |
|---|---|---|
| 7,814,292 B2 | 10/2010 | Tsien |
| 7,920,139 B2 | 4/2011 | Nystad et al. |
| 2002/0130886 A1 | 9/2002 | Baldwin |
| 2002/0171658 A1 | 11/2002 | Ramani et al. |
| 2002/0180747 A1 | 12/2002 | Lavelle et al. |
| 2003/0117409 A1 | 6/2003 | Lefebvre et al. |
| 2003/0165147 A1 | 9/2003 | Shimada |
| 2003/0179199 A1 | 9/2003 | Deering et al. |
| 2005/0002371 A1 | 1/2005 | Anderson |
| 2005/0044319 A1 | 2/2005 | Olukotun |
| 2005/0225670 A1 | 10/2005 | Wexler et al. |
| 2006/0184753 A1 | 8/2006 | Jeter et al. |
| 2006/0256111 A1* | 11/2006 | Chihoub et al. ............. 345/424 |
| 2007/0050601 A1 | 3/2007 | Chaudhry et al. |
| 2007/0067505 A1 | 3/2007 | Kaniyur et al. |
| 2007/0106874 A1 | 5/2007 | Pan et al. |
| 2007/0229503 A1 | 10/2007 | Witzel et al. |
| 2008/0320230 A1 | 12/2008 | Vishin et al. |

FOREIGN PATENT DOCUMENTS

| | | |
|---|---|---|
| EP | 0 910 047 | 4/1999 |
| EP | 0 910 047 | 7/2001 |
| GB | 2368763 | 5/2002 |
| GB | 2 444 598 | 6/2008 |
| WO | WO 97/06512 | 2/1997 |
| WO | WO 99/45502 | 10/1999 |
| WO | WO 00/49574 | 8/2000 |
| WO | WO 2005/091227 | 9/2005 |

OTHER PUBLICATIONS

P. Beaudoin et al, "Compressed Multisampling for Efficient Hardware Edge Antialiasing" *Proceedings of Graphics Interface,* May 2004, pp. 169-176.

UK Search and Examination Report dated Feb. 25, 2010 for GB 0918690.9.

Office Action mailed May 27, 2010 in co-pending U.S. Appl. No. 11/791,753.

U.S. Appl. No. 12/588,666, filed 10/22/09, Nystad et al.

Product review of ATI RADEON 9700 Pro Preview, Aug. 2002, www.firingsquad.com, 44 pages.

T. Akenine-Moller, "FLIPQUAD: Low-Cost Multisampling Rasterization" Chalmers University of Technology Technical Report 02-04, Apr. 2002, pp. 1-4.

International Search Report and Written Opinion of the International Searching Authority mailed Feb. 27, 2006 in PCT/GB2005/004573.

International Search Report mailed Jun. 26, 2008 in corresponding European Application No. GB0801812.9.

U.S. Appl. No. 12/929,956, filed Feb. 28, 2011; Inventor: Nystad et al.

Office Action mailed Dec. 21, 2010 in co-pending U.S. Appl. No. 12/068,007.

English translation of Japanese Notice of Reasons for Rejection mailed Mar. 15, 2011 in JP 2007-542124.

U.S. Appl. No. 12/068,009, filed Jan. 31, 2008; Inventor: Sorgard et al.

U.S. Appl. No. 12/068,010, filed Jan. 31, 2008; Inventor: Nystad et al.

U.S. Appl. No. 12/068,012, filed Jan. 31, 2008; Inventor: Nystad et al.

Office Action mailed Jun. 27, 2011 in co-pending U.S. Appl. No. 12/929,956.

Office Action mailed Jul. 9, 2010 in co-pending U.S. Appl. No. 12/068,010.

Office Action mailed Jul. 9, 2010 in co-pending U.S. Appl. No. 12/068,012.

Office action mailed Jan. 31, 2011 in co-pending U.S. Appl. No. 12/068,010.

Office action mailed Feb. 8, 2011 in co-pending U.S. Appl. No. 12/068,012.

Office Action mailed Nov. 23, 2010 in co-pending U.S. Appl. No. 12/068,009.

D. Kim et al, "An SoC With 1.3 Gtexels/s 3-D Graphics Full Pipeline for Consumer Applications" IEEE Journal of Solid-State Circuits, vol. 41, No. 1, Jan. 2006, pp. 71-84.

H. Igehy et al, "Prefetching in a Texture Cache Architecture" 1998, Eurographics/SIGGRAPH Workshop on Graphics Hardware.

D. Blythe, "The Direct3D 10 System" 2006, ACM.

"Cray MTA" http://www.cmf.nrl.navy.mil/CCS/help/mta/ 2002.

R. Rajwar et al, "Speculative Lock Elision: Enabling Highly Concurrent Multithreaded Execution" MICRO '01, Dec. 2001.

A. Ho et al, "On deadlock, livelock, and forward progress" Technical Report No. 633, University of Cambridge Computer Laboratory, May 2005, pp. 1-8.

T. Li et al, "Spin Detection Hardware for Improved Management of Multithreaded Systems" IEEE Transactions on Parallel and Distributed Systems, vol. 17, No. 6, Jun. 2006, pp. 508-521.

S. Abdelwahed et al, "Blocking Detection in Discrete Event Systems" 6 pages.

Related U.S. Appl. No. 11/791,753, filed May 29, 2007; Inventor: Nystad et al.

Related U.S. Appl. No. 11/068,007, filed Jan. 31, 2008; Inventor: Nystad et al.

Sim Dietrich, "Guard Band Clipping in Direct3D," Nvidia Corporation, pp. 1-7, Apr. 17, 2008.

Glide 2.2 Programming Guide, Programming the 3Dfx Interactive Glide™ Rasterization Library 2.2, Document Release 014, Mar. 8, 2007, pp. 1-168.

\* cited by examiner

METHODS OF AND APPARATUS FOR PROCESSING COMPUTER GRAPHICS

The present invention relates to the processing of computer graphics, and in particular to a method of and an apparatus for carrying out anti-aliasing when processing computer graphics.

The present invention will be described with particular reference to the processing of three dimensional graphics, although as will be appreciated by those skilled in the art, it is equally applicable to the processing of two-dimensional graphics as well.

As is known in the art, 3D graphics processing is normally carried out by first splitting the scene to be displayed into a number of similar basic components (so-called "primitives") to allow the 3D graphics processing operations to be more easily carried out. These "primitives" are usually in the form of simple polygons, such as triangles, and are usually described by defining their vertices.

Once the scene to be displayed has been divided into a plurality of graphics primitives, the graphics primitives are usually then further divided, as is known in the art, into discrete graphical entities or elements, usually referred to as "fragments", on which the actual graphics processing operations (such as rendering operations) are carried out. Each such graphics fragment will represent and correspond to a given position or positions in the primitive and comprise, in effect, a set of data (such as colour and depth values) for the position or positions in question.

Each graphics fragment (data element) may correspond to a single pixel (picture element) in the final display (since as the pixels are the singularities in the final picture to be displayed, there can be a one-to-one mapping between the "fragments" the 3D graphics processor operates on and the pixels in the display). However, it can be the case that there is not a one-to-one correspondence between "fragments" and "pixels", for example where particular forms of post-processing such as down-scaling are carried out on the rendered image prior to displaying the final image.

Thus two aspects of 3D graphics processing that are typically carried out are the "rasterising" of graphics "primitive" (or polygon) position data to graphics fragment position data (i.e. determining the (x, y) positions of the graphics fragments to be used to represent each primitive in the scene to be displayed), and then "rendering" the "rasterised" fragments (i.e. colouring, shading, etc., the fragments) for display on a display screen.

(In 3D graphics literature, the term "rasterisation" is sometimes used to mean both primitive conversion to fragments and rendering. However, herein "rasterisation" will be used to refer to converting primitive data to fragment addresses only.)

The rasterisation process basically involves determining for an array of sampling points that is, in effect, overlaid on the scene to be displayed, which of the sampling points in the array the primitive in question covers. Fragments having the appropriate (x, y) position(s) are then generated for rendering the sampling points that are found to be covered by the primitive.

The rendering process basically involves deriving the data necessary to display each fragment. Such data typically comprises red, green and blue (RGB) colour values for each fragment (which will basically determine the colour of the fragment on the display), and a so-called "Alpha" (transparency) value for each fragment.

As is known in the art, this data is typically derived by carrying out individual rendering processes (steps) on each fragment (i.e. the data for that fragment) one after another in a linear or pipelined fashion. Thus, for example, each fragment is firstly allocated initial RGB and alpha values, based on, e.g., the (x, y) position of the fragment, and the colour and transparency data recorded for the vertices of the primitive to which the fragment belongs. Operations such as texturing, fogging, and blending, etc., are then carried out on the fragment data in succession. These operations modify the initial RGB and alpha values set for each fragment, such that after the last processing operation, each fragment has an appropriate set of RGB and alpha values to allow that fragment to be displayed correctly on the display screen.

One problem that is encountered when processing graphics for display (when displaying computer generated images) is that the displayed image is quantised into the discrete pixel locations of the display, e.g. monitor or printer, being used. This limits the resolution of the image that is displayed and can produce unwanted visual artifacts, for example, where the resolution of the output display device is not high enough to display smooth lines. These effects are commonly referred to as "aliasing".

FIG. 1 illustrates such aliasing effects. The lefthand side of FIG. 1 shows the image to be drawn, and the righthand side shows the actual image that is displayed. As can be seen, the desired smooth curve of the white object in fact has a jagged appearance on the display. This is aliasing. (In FIG. 1, each square represents a pixel of the display, and the crosses represent the points at each (x, y) pixel location for which the colour value for that pixel location is determined (sampled). For example, the pixel A in FIG. 1 is drawn as all white, because the colour sampling point for that pixel location falls within the white object. It should be noted that in FIG. 1 only sample crosses on the pixels of interest are shown, although in practice all pixels will be sampled.)

All aliasing artifacts (that could be visible to the naked eye) could be removed by using a sufficiently high resolution display. However, the resolution of electronic displays and printers is typically limited, and so many graphics processing systems use other techniques to try to remove or reduce the effects of aliasing. Such techniques are typically referred to as anti-aliasing techniques.

One known anti-aliasing technique is referred to as supersampling or oversampling.

In such an arrangement, there are plural sampling points (positions), per pixel of the final display, and a separate colour sample is taken for each (covered) individual sampling point (e.g. by rendering each sampling point as a separate fragment). The effect of this is that a different colour sample is taken for each sampling point of a pixel that is covered by a primitive during the rendering process.

This means that plural colour samples are taken for each pixel location of the display (one for each sampling point for the pixel, since a separate colour value is rendered for each sampling point). These plural colour samples are then combined into a single colour for the pixel when the pixel is displayed. This has the effect of smoothing or averaging the colour values from the original image at the pixel location in question.

FIG. 2 illustrates the supersampling process. In the example shown in FIG. 2, four sample points are determined for each pixel in the display and separate colour samples are taken for each sample point during the rendering process. (Each such sample can accordingly effectively be viewed as a "sub-pixel", with each pixel in the display being made up of four such sub-pixels.) The four colour value samples (sub-pixels) for a given pixel are then combined (downfiltered) such that the final colour that is used for the pixel in the display is an appropriate average (blend) of the colours of the four colour samples taken for the pixel.

This has the effect of smoothing the image that is displayed, and, e.g., reduces the prominence of aliasing artifacts by surrounding them with intermediate shades of colour. This can be seen in FIG. 2, where the pixel A now has two "white" samples and two "black" samples and so is set to 50% "white" in the displayed image. In this way, the pixels around the edges of the white object are blurred to produce a smoother edge, based on, e.g., how many samples are found to fall on each side of the edge.

Supersampling in effect processes the screen image at a much higher resolution than will actually be used for the display, and then scales and filters (down samples) the processed image to the final resolution before it is displayed. This has the effect of providing an improved image with reduced aliasing artifacts, but requires greater processing power and/or time, since the graphics processing system must in effect process as many fragments as there are samples (such that, e.g., for 4× supersampling (i.e. where 4 samples are taken for each pixel location), the processing requirements will be four times greater than if there was no supersampling).

Other anti-aliasing techniques have therefore been proposed that, while still providing some improvement in image quality, have less processing requirements than full supersampling.

One common such technique is referred to as "multisampling".

In the case of multisampling, multiple sampling points are again tested for each pixel to determine whether a given primitive covers the sampling points or not when the image is rasterised into fragments (at the rasterisation stage). Thus the sampling point coverage of a primitive in a multisampling system is determined in a similar fashion to a "supersampling" system (and so the positions of the outer geometric edges of the primitives are still effectively "supersampled" (oversampled) in a multisampling system).

However, in the rendering process of a multisampling system, all the sampling points for a given pixel that are covered by the primitive in question are allocated the same single, common set of fragment data (e.g. depth value, colour value, etc.) (rather than each having their own separate set of fragment data as would be the case for supersampling).

Thus, in multisampling, plural samples are again taken for each pixel that will make up the final display, but rather than determining a separate colour value for each sample when rendering the "pixel" (as would be the case for a full supersampling system), a single colour value is determined and applied to all the samples for a pixel that are found to belong to the same object in the final image. In other words multisampling calculates a single colour value for a given pixel for a given object in the scene, which colour value is applied to (reused for) all samples (subpixels) of the pixel that are covered by that object (in contrast to supersampling where a separate colour value is determined for each sample).

Because only a single colour value is used for multiple samples for a given pixel, multisampling is less processing intensive than supersampling and therefore can allow faster processing and performance than supersampling. However, there is a reduction in the quality of the displayed image as compared to supersampling, since although objects' edges are still sampled at a higher resolution, colours are not.

Notwithstanding this, many graphics processing systems use a multisampling anti-aliasing technique, as multisampling can in general provide adequate (and improved as compared to when there is no multisampling or supersampling at all) anti-aliasing in a rendered image, but without the significant extra processing and computational burden that full supersampling entails.

However, the Applicants have now recognised a drawback of existing multisampling graphics processing arrangements. This drawback relates to the process known as an "Alpha test" that is used in many graphics processing systems.

As is known in the art, many graphics processing systems use a property commonly referred to as "alpha" or an "alpha value" to, in effect, represent the transparency (or otherwise) of objects to be rendered. In effect, graphics vertices and fragments, for example, may have associated with them so-called alpha values, which are like the colour (red, green, blue) values associated with the vertices and fragments, but instead represent the "transparency" of an object at the vertex or fragment, etc.

The alpha value for a given fragment may be, e.g., derived from alpha values defined for the vertices of the primitive to which the fragment belongs, derived from a texture to be applied to the fragment, or derived from a calculation in a fragment shader (pixel shader) program to be applied to the fragment.

A common use of alpha values in graphics processing is for "bill-boarding", such as rendering repeated, particularly background, patterns, such as trees and grass in a scene to be displayed. Alpha values can be used to apply such features to a scene effectively as textures, which may be less costly than, e.g., defining primitives for, e.g., each leaf of a tree, etc.

Such processing is usually performed by carrying out a so-called "Alpha test" during the rendering process. The Alpha test is usually a defined step in the rendering pipeline and typically involves comparing the alpha value associated with a fragment being rendered with a threshold or reference alpha value that has been defined for the scene and Alpha test in question, and then keeping or discarding the fragment in question on the basis of the comparison. In other words, the Alpha test uses a defined threshold or reference alpha value to keep or discard fragments (to write or not write the fragments to the tile or frame buffer) that are being rendered.

The Applicants have further recognised that a consequence of performing an Alpha test as a scene is rendered is that it can introduce edges into the scene to be displayed. An edge or line may be created, for example, where the alpha value crosses the threshold it's compared with in the alpha test.

For example, if the Alpha test reference value effectively defines a line or lines across the scene to be displayed, then that can result in fragments of a given primitive (e.g. having a given alpha value) being discarded on one side of the line, but being retained on the other side of the line. Similarly, if the alpha values associated with fragments progressively change across the surface of a primitive, then again there may effectively be a line across the primitive to one side of which fragments are kept, but to the other side of which fragments are discarded.

These Alpha test processes can accordingly effectively cause a new edge or edges to be present for or in a primitive when it is displayed. (It should be noted here that such alpha test introduced "edges" are not present or introduced at the rasterisation stage, but only arise later on during the rendering process, when the alpha test is carried out.)

The Applicants have further recognised that it would accordingly be desirable for such edges introduced by the alpha test to anti-aliased, in the same way that it is desirable for any other edges, such as the geometric outer edges of primitives, to be anti-aliased.

However, in the case of a multisampled graphics processing arrangement, as discussed above, when fragments are rendered, a single set of fragment data (e.g. colour values (R, G, B values) and an alpha value) is derived and used for all sample positions of a pixel that are covered by a given primitive. Thus, the sampling points for a given pixel will only have a single alpha value associated with them, which alpha value is then used for all the sample positions of the pixel.

In other words, in a multisampled graphics processing arrangement, only a single alpha value to be used in common for all the samples of a pixel will be derived. Thus, when the alpha test is carried out, since each sample has the same alpha value, either all the samples or no samples will be discarded, such that, in effect, the pixel as a whole will either be kept or discarded as a consequence of the alpha test.

The Applicants have recognised that a consequence of this is that when the alpha test is carried out, the test will either cause a pixel to be retained or discarded in its entirety. Moreover, this means the Alpha test is effectively performed at a pixel-level resolution, i.e. on a whole pixel-by-pixel basis.

The effect of this then is that any edges in the image introduced by the alpha test are not processed in an oversampled (supersampled) manner and accordingly will not be anti-aliased (in contrast to the geometric outer primitive edges that are processed in an oversampled (supersampled) manner on rasterisation as discussed above).

Thus, the Applicants have recognised that even in a multisampled graphics rendering process, edges introduced by an Alpha test will not be anti-aliased and so their appearance will not be so good.

(This issue does not tend to arise with fully supersampled graphics processing arrangements, since in that case, each "sample" will effectively have its own colour and alpha values and so the alpha test will be performed at the higher, supersampled, resolution anyway (and thus anti-aliased). However, as discussed above, supersampling may not always be desirable or possible, and in many cases multisampled graphics processing arrangements are preferred as a trade-off between quality and processing workload.)

The Applicants believe therefore that there remains scope for improvements to multisampled graphics processing systems, in particular in relation to the handling of the alpha test in such arrangements.

According to a first aspect of the present invention, there is provided a method of processing a graphics primitive of an image to be displayed, the method comprising:

determining for each sampling point of a plurality of sets of plural sampling points whether the graphics primitive covers the sampling point;

generating a set of graphics fragments for rendering the primitive for display, each graphics fragment corresponding to a set of plural sampling points found to include a sampling point that is covered by the primitive, and defining a set of fragment data to be used for the sampling points of the set of sampling points found to be covered by the primitive;

rendering graphics fragments generated for the primitive to determine a set of rendered fragment data for each rendered graphics fragment; and performing an alpha test in respect of a fragment or fragments as part of the rendering process; wherein:

the alpha test is performed by:

generating an individual alpha value for each covered sampling point that the fragment in question corresponds to; and carrying out an alpha test for each covered sampling point individually using the individual alpha value generated for the sampling point.

According to a second aspect of the present invention, there is provided a system for processing a graphics primitive of an image to be displayed, the system comprising:

means for determining for each sampling point of a plurality of sets of plural sampling points whether the graphics primitive covers the sampling point;

means for generating a set of graphics fragments for rendering the primitive for display, each graphics fragment corresponding to a set of plural sampling points found to include a sampling point that is covered by the primitive, and defining a set of fragment data to be used for the sampling points of the set of sampling points found to be covered by the primitive;

means for rendering graphics fragments generated for the primitive to determine a set of rendered fragment data for each rendered graphics fragment; and means for performing an alpha test in respect of a fragment or fragments as part of the rendering process; wherein:

the means for performing the alpha test comprises:

means for generating an individual alpha value for each covered sampling point that the fragment in question corresponds to; and means for carrying out the alpha test for each covered sampling point individually using the individual alpha value generated for the sampling point.

In the present invention, the rendering process operates on (renders) graphics fragments that each correspond to a set of plural sampling points of the image to be displayed. (Each set of sampling points will, for example, and typically, as discussed above, correspond to a pixel in the final display.)

The effect of this then is that a given fragment will define and provide a common, single set of fragment data to be used for all the sampling points of the set of sampling points that the fragment corresponds to (is being used to render). In other words, the present invention is a multisampled graphics processing arrangement.

However, when the alpha test is performed on a fragment as part of the rendering process, rather than a single alpha value and alpha value comparison test being used for the fragment as a whole, as would be the case in prior art multisampling systems, in the present invention, an individual alpha value is generated for each covered sampling point that the fragment corresponds to (is being used to render) and then the alpha test is carried out for each covered sampling point individually.

The effect of this is that the alpha test is carried out for and in respect of each (covered) sampling point individually (separately), and using an individual alpha value generated for the sampling point in question, i.e., in effect at the resolution (level) of the sampling points, rather than at the resolution (level) of the fragment (of the set of plural sampling points) as a whole.

This facilitates then, for example, being able to retain or discard sampling points of a fragment (of a set of sampling points) on an individual basis as a result of the alpha test, rather than, as in prior art multisampling arrangements, only being able to retain all or discard all of the sampling points of a fragment (of a set of sampling points) together as a result of the alpha test.

This means, inter alia, that in the present invention the alpha test can, in effect, still be carried out in a manner akin to supersampling (i.e. with plural individual samples per pixel), notwithstanding the fact that rendering process does not operate in a full supersampled manner, but is a "multisampled" arrangement.

Thus, in effect, in the present invention multiple alpha samples can be used (are supported) per fragment (and, accordingly, e.g., per pixel of the display), but without the need for a fully supersampled system. The present invention accordingly permits anti-aliasing to be performed on edges introduced by alpha-testing, but without the need to have a fully "supersampled" rendering process (and accordingly without the large workload increase associated with a fully supersampled system).

According to a third aspect of the present invention, there is provided a method of performing an alpha test in a graphics rendering system, in which graphics fragments to be rendered can each represent plural sampling points of an image to be displayed that are covered by a primitive but each have initially associated with them a single alpha value to be used for the fragment, the method comprising performing an alpha test for a fragment by:

generating an individual alpha value for each covered sampling point that the fragment in question corresponds to; and carrying out an alpha test for each covered sampling point individually using the individual alpha value generated for the sampling point.

According to a fourth aspect of the present invention, there is provided a system for performing an alpha test in a graphics rendering system, in which graphics fragments to be rendered can each represent plural sampling points of an image to be displayed that are covered by a primitive but each have associated with them initially a single alpha value to be used for the fragment, the system comprising:

means for generating an individual alpha value for each covered sampling point that the fragment in question corresponds to; and means for carrying out an alpha test for each covered sampling point individually using the individual alpha value generated for the sampling point.

The sets of sampling points taken of the image to be displayed (and that are accordingly associated with each fragment that is rendered) can be selected as desired. As is known in the art, each set of sampling points (and accordingly each sampling point) will represent a different location (x, y position) in the image to be displayed (although the relative positions of the sampling points in each set may (and typically will be) the same).

Where, as will typically be the case, the image is to be displayed on an output device having a display comprising a plurality of pixels, each set of sampling points preferably corresponds to a set of sampling points for a given pixel (pixel location) of the display, or to a set of sampling points for a part of a pixel (e.g. a sub-pixel) of the display. In the latter arrangement, a group of plural sets of sampling points preferably make up an overall set of sampling points for a pixel of the display. In these arrangements, each fragment will effectively render fragment data for a given pixel in the display.

The sets of sampling points could represent (cover) the entire area of the image that is to be displayed, or could, e.g., represent (and cover) only a part of the overall image to be displayed. The latter arrangement would be used in, for example, a tile-based rendering system where separate parts (tiles) of the image (such as 16×16 pixel tiles) are rendered in turn and then combined to display the final image. In this case, plural sets of sampling points representing the desired tile (part) of the image would be used to process the primitive, and the process would then be repeated, if necessary, for other tiles of the image.

Each set of sampling points includes plural sampling points (i.e. covers a plurality of sampling positions in the image). The actual number of sampling points can be selected as desired, although four is a preferred number.

The pattern and (relative) positions of the sample points in each set of sampling points (the sampling pattern) can be selected as desired. For example, any known suitable anti-aliasing sampling pattern can be used, such as ordered grid supersampling. Most preferably a rotated grid supersampling pattern is used, as that provides a better sampling effect, as is known in the art. It is accordingly preferred for each sample point to have unique x and y coordinates in the image.

In one preferred embodiment, each set of sampling points used to sample the image for a given primitive is identical (i.e. uses the same number and pattern and relative positions of sampling points). In this case the sets of sampling points will be the same for each fragment.

In another preferred embodiment, the sets of sampling points used to sample the image for a given primitive can differ and/or are different, e.g. in terms of the number of sampling points and/or the sampling pattern or relative positions used for each set of sampling points. Most preferably the sets of sampling points can differ as between fragments used to render a primitive.

In one preferred embodiment, each fragment that is used to render the primitive corresponds to a different set of sampling points. In such an arrangement, a single fragment only would in effect be generated and used to render in common the sampling points of each set of sampling points, with each fragment rendering the (plural) sampling points of a (different) set of sampling points in common.

The set of graphics fragments that is generated for rendering the primitive should comprise sufficient fragments for rendering the primitive appropriately for display. Thus, for example, where it is known that a part of the primitive will not actually be seen in the final display, it would not be necessary to generate fragments for that part of the primitive. Equally, even if fragments have been generated for a primitive, it is preferred that any fragments that will not actually be seen in the final image are not rendered. (This could be assessed using, e.g., an early depth (z)-test, as is known in the art.)

The fragment data that is determined and stored for each fragment and sampling point can be any suitable such data. It should at least include appropriate colour and/or transparency data, such as RGB and alpha values, to allow, e.g., a pixel of the display to be displayed appropriately. (It should be understood here that references herein to "colour data" include appropriate graycodes or similar data, such as would be used for a monochromatic or black and white display.)

In the case of processing three-dimensional graphics at least, the fragment data that is determined and stored preferably also includes a depth (Z) value for a fragment (and accordingly for the sample position or positions in question).

Other fragment data, such as so-called stencil data can also be (and preferably is) determined and stored, as appropriate (and if desired).

The rendered fragment data should be stored, as appropriate, in an appropriate fragment data array, as is known in the art. This array should, as is known in the art, represent a two-dimensional array of, e.g., fragment positions, that can then be processed appropriately to, e.g., display a 2D array of pixels. The array of fragment data may, e.g., correspond to an array of sample positions for the image to be displayed.

The alpha values that are generated for each (covered) sampling point that a fragment corresponds to for use in the alpha test process of the present invention can be generated in any desired and suitable manner.

It should be noted here that in the present invention, an individual alpha value is generated for each sample point. In other words, an alpha value is generated separately for each (relevant) sample point, and the alpha value generation process is carried out in respect of each sample point separately (rather than, e.g., each sample point simply being allocated the initially allocated or defined alpha value for the fragment).

Thus each sample point will undergo its own alpha value generation process, and will tend to have, and preferably does have, a different alpha value generated for it to the other sampling points that the fragment corresponds to (although in some cases, it may be that the alpha values generated for each sample point will be the same, depending on how the alpha values vary across the primitive, for example). Thus, in a preferred embodiment, the alpha value generated for each sampling point is not the same as the alpha values generated for the other sampling points that the fragment corresponds to.

In a particularly preferred embodiment, the individual alpha values for the sampling points are generated by estimating the alpha value at each sampling point from an alpha value or values associated with the fragment in question and/or associated with other fragments being rendered. For example, if a fragment has a given alpha value already associated with it (e.g. defined for it at the start of the rendering process), the alpha values for the sampling points of the fragment to be used for the alpha test process of the present invention are preferably generated (estimated), at least in part, using the alpha value defined for the fragment.

Thus, in a particularly preferred embodiment, the individual alpha values for the sampling point(s) of a fragment are generated using the (single) alpha value that is initially defined for the fragment in question during the rendering process.

In a particularly preferred embodiment, the generated alpha values are generated using the initial alpha values defined for more than one fragment to be rendered, such as, and preferably, the alpha value defined for the fragment in question and the alpha value or values defined for one or more neighbouring fragments, and preferably immediately neighbouring fragments, of the fragment in question.

In one preferred embodiment, the alpha values of a two-by-two block of fragments (a block that is 2 fragments wide by two fragments tall) that includes the fragment in question are used to generate (estimate) the individual alpha values for each sampling point (e.g., and preferably, by using a bilinear filtering process or similar). Thus, preferably, the initial alpha values defined for four fragments are used to generate the individual alpha values for the sampling positions.

Other arrangements would, of course, be possible. For example, the more initial alpha values defined for fragments that are used for the alpha value generation process, the more accurate the estimation of the alpha value for a given sampling point may be (but, on the other hand, the more processing intensive the estimation process may be). For example, the initially set alpha values of a 3×3 block of fragments could be used. It would also, e.g., be possible to use alpha values defined for fragments that are spaced further from the fragment in question, rather than immediately adjacent fragments, if desired.

The alpha values for the sampling points can be generated from the initially defined or derived single alpha values for the fragment or fragments in any suitable and desired manner. In effect, the aim is to estimate (recreate), so far as possible, the alpha value at the sampling point, and any suitable function that can give an estimate of the alpha value at each sample point can be used to do this. Indeed, it may be the case that different estimation functions may be more suited to certain circumstances than others, for example with respect to whether alpha values for the scene to be displayed vary smoothly across the scene, or more erratically.

In a particularly preferred embodiment, the alpha values for the sampling points of the fragment are estimated by taking the initial, single alpha value defined for the fragment as the alpha value at the centre of the fragment, estimating the difference between the alpha value at the sample point in question as compared to the centre point of the fragment, and adding the estimated difference in the alpha value to the initial, single alpha value for the fragment to derive the alpha value to be used for the sample position. In other words, in a preferred embodiment, the difference between the alpha value at the sample point and at the centre of the fragment is estimated, and then used, together with the alpha value initially defined or derived for the fragment, to generate an alpha value for the sampling point.

The initial alpha values for the fragments and/or the alpha values used for the centre of the fragments may, e.g., be a static alpha value, a dynamically varying value, a textured or computed value, etc., if and as desired.

In these arrangements, the difference between the alpha value at the centre of the fragment and at the sample position can be derived or estimated in any desired manner. However, in a particularly preferred embodiment a gradient estimation method is used. In other words, preferably the rate of change (the slope (derivative)) of the alpha value with respect to distance from the centre of the fragment to the sample point is estimated or determined, and then used to derive the difference in the alpha value (based on the distance of the sample point from the centre of the fragment).

In these arrangements, the rate of change (slope) of the alpha values with respect to distance can be estimated or derived as desired and in any suitable manner. In a particularly preferred embodiment, it is done by taking the difference between the alpha values of (and the distance between the centre points of) appropriate neighbouring fragments.

Thus, for example, the rate of change (slope) of the alpha value in the x direction can be, and is preferably, estimated by taking the alpha values of two fragments that are at positions x, and x+1 (or x−1), with respect to each other, determining the difference between the fragments, alpha values, and the distance along the x-axis between the centres of the two fragments, and using the alpha-value difference and the distance to determine an estimate of the gradient of the alpha value in the x-direction. A similar process is preferably used to estimate the gradient of the alpha value in the y-direction, and these two gradients can then be used to estimate the change in alpha value along any line on the screen.

In general, any suitable process for deriving the alpha values using the known alpha values and alpha value differences, etc., can be used, as desired.

An individual alpha value should be generated for each covered sampling point that the fragment corresponds to (is being used to render). In a preferred embodiment, alpha values are only generated for the sampling point or points found to be covered by the primitive, although it would be possible simply to generate an alpha value for all the sampling points in the set of sampling points that the fragment corresponds to, irrespective of whether they are covered by the primitive in question or not.

The alpha values generated for each sampling point are used to perform an alpha test in respect of each sampling point. This alpha test may be carried out in any desired and suitable manner, and may, and preferably does, involve, as is known in the art, comparing the individual alpha value generated for the sampling point, with a respective reference or threshold alpha value defined (e.g., and preferably, predetermined) for the alpha test for the sampling point in question. More complex tests than a simple threshold comparison could also be used, if desired.

The reference or threshold alpha value used for the alpha test may comprise any suitable or desired such value, and may be derived or defined in any suitable and desired manner. For example, there may be a fixed, static, threshold alpha value defined for a scene or part of a scene for display as a whole. Alternatively, the reference or threshold alpha value may be in some way dynamic or varying, for example in dependence on its position (x, y position) in the scene, or in dependence upon some other parameter or factor.

In general, there will be a particular alpha value that is defined (for example either predetermined or derived in use) for the particular alpha test for the sampling point in question, and that threshold or reference alpha value may be the same as or different to the reference alpha value used for the alpha test for other sampling points of the same fragment and/or for sampling points of other fragments, depending, for example, upon whether there is a single fixed reference alpha value for the scene as a whole, or whether the alpha value varies in some way across the scene.

The results of the alpha test comparisons for each individual sample points can be used as desired. In one particularly preferred embodiment, they are used to decide whether to discard (or not) the sample position in question, as is known in the art. In effect, if the alpha test comparison indicates that the sample position should be kept, then the fragment's colour value, etc., will be retained for (written to) the sample position (e.g. in the fragment data array) (i.e. allowed potentially to affect the end colour for that sample position), whereas if the alpha test comparison indicates that the sample position should be discarded, then the fragment's colour value, etc., will not be retained for (not be written to) the sample position in question.

It will be appreciated that in these arrangements, there may need to be some mechanism for denoting or recording whether a given sampling position has been discarded as a result of the alpha test. This can be achieved in any desired and suitable manner.

However, in a particularly preferred embodiment each graphics fragment has associated with it data indicating which of the sampling points in the set of sampling points that the fragment corresponds to, the fragment is being used to render (i.e. the sampling points in the set of sampling points that the fragment corresponds to, for which the rendered fragment data should (prospectively) be stored in the output fragment data array). The system preferably then operates to store, as appropriate the rendered fragment data in the fragment data array for the indicated, selected sample positions, but not for the remaining sample positions associated with the fragment.

In this arrangement, this data indicating which sampling points the fragment is being used to render will, for example, and preferably, initially be based on and correspond to the sampling positions found to be covered by the primitive in question. However, the alpha-test results are preferably then used to modify this data to indicate sample positions that are to be discarded as a result of the alpha tests.

The information indicating which sample points the fragment is being used to render is preferably associated with or part of the fragment data for the fragment that passes through the renderer (such as the RGB and alpha values for the fragment). It is preferably in the form of a coverage mask that indicates, for each sample position of the set of sample positions that is associated with the fragment, whether the fragment is being used to render that sample point (i.e. whether the fragment's data should (prospectively) be stored for that sample point). The mask can then be, and is preferably, modified as a consequence of the alpha test for each sampling point.

This arrangement has been found to be a particularly convenient way of associating a given fragment with the appropriate sample points, and to facilitate the operations of the present invention.

Although as discussed above, the alpha test of the present invention is in one preferred embodiment used to keep or discard sampling positions associated with a fragment, other arrangements and uses of the result of the alpha test would be possible.

For example, in a preferred embodiment, the alpha tests on the individual sample positions are also or instead used to determine or estimate whether an alpha-test introduced edge could pass through the fragment in question.

This could be done, e.g., by determining whether some of the sample positions for the fragment "pass" the alpha test comparison (e.g. exceed the reference alpha value) but other sample positions of the fragment "fail" the alpha test (e.g. are less than the reference value). This would then indicate that an alpha-test introduced edge could or will pass through the fragment.

Other edge-testing arrangements, such as a geometric-based test to calculate where the edge is, could also or instead be used. In general any line function test similar to the testing done in normal rasterisation could also or instead be used for this purpose if desired.

Thus, in a preferred embodiment, the alpha test in the manner of the present invention is used to assess whether an alpha-test introduced edge could pass through a fragment.

If, in these arrangements, it is found that an alpha-test-introduced edge could pass through a fragment, then, in a particularly preferred embodiment, the fragment in question is rendered again (re-issued for rendering), but in a fully supersampled manner. This may be done, e.g., by looping back to an earlier point in the rendering process (pipeline) and splitting the fragment into several fragments (multiple copies), each representing a single sub-sample (sampling point).

This would then allow the alpha-test-edge to be anti-aliased (by "supersampling" it), but without the need to process the entire scene or primitive in a supersampled manner (since it will only be those fragments identified as being at risk of lying on the alpha-test-edge that are processed in a supersampled manner).

Indeed, it is believed that such arrangements and other arrangements of the concept of the present invention may be new and advantageous in their own right.

Thus, according to a fifth aspect of the present invention, there is provided a method of processing a graphics primitive of an image to be displayed, the method comprising:

generating a set of graphics fragments for rendering the primitive for display rendering graphics fragments generated for the primitive to determine a set of rendered fragment data for each rendered graphics fragment; and performing an alpha test in respect of a fragment or fragments as part of the rendering process; wherein:

the alpha test is performed by:

generating an individual alpha value for a sampling point or sampling points for the fragment or fragments in question; and carrying out an alpha test for the or each sampling point individually using the individual alpha value generated for the sampling point.

According to a sixth aspect of the present invention, there is provided a system for processing a graphics primitive of an image to be displayed, the system comprising:

means for generating a set of graphics fragments for rendering the primitive for display;

means for rendering graphics fragments generated for the primitive to determine a set of rendered fragment data for each rendered graphics fragment; and means for performing an alpha test in respect of a fragment or fragments as part of the rendering process; wherein:

the means for performing the alpha test comprises:

means for generating an individual alpha value for a sampling point or sampling points for the fragment or fragments in question; and means for carrying out an alpha test for the or each sampling point individually using the individual alpha value generated for the sampling point.

According to a seventh aspect of the present invention, there is provided a method of performing an alpha test in a graphics rendering system, in which graphics fragments to be rendered each have initially associated with them a single alpha value to be used for the fragment, the method comprising performing an alpha test for a fragment or fragments by:

generating an individual alpha value for a sampling point or sampling points for the fragment or fragments in question; and carrying out an alpha test for the or each sampling point individually using the individual alpha value generated for the sampling point.

According to an eighth aspect of the present invention, there is provided a system for performing an alpha test in a graphics rendering system, in which graphics fragments to be rendered each have associated with them initially a single alpha value to be used for the fragment, the system comprising:

means for generating an individual alpha value for a sampling point or sampling points for a fragment or group of fragments that is to undergo an alpha test; and means for carrying out an alpha test for the or each sampling point individually using the individual alpha value generated for the sampling point.

As will be appreciated by those skilled in the art, these aspects and embodiments of the invention can, and preferably do, include any one or more or all of the preferred and optional features of the invention described herein, as appropriate. Thus, for example, preferably an individual alpha value is generated for each of a plurality of sampling points for the fragment or fragments in question. Similarly, the individual alpha values generated for the sampling points are preferably estimated in the manner discussed above (and, e.g., generated using at least in part, the alpha value(s) initially defined for or allocated to the fragments or to plural of the fragments).

Similarly it is preferred that the sampling points for which individual alpha values are generated correspond to the sampling points used to determine the coverage of the primitive at the rasterisation stage. However, it is not necessary for the sampling points that are used in these arrangements (e.g., as discussed below) to test for the presence of an alpha-test-edge) to correspond to the sampling points used during rasterisation to test for the coverage (or not) of primitives to be rendered.

For example, alpha values at the corners of a or each fragment (i.e. sampling points at the corner(s) of a fragment or fragments) could be, and preferably are, generated in these arrangements (e.g. for the purpose of determining whether an alpha-test-edge may pass through the fragment or not). Taking the alpha values at the corners of fragments may in fact be a more reliable test for some applications.

Equally, the sample points (e.g. the test for the presence of an alpha-test-edge) need not be in respect of (be carried for) fragments individually, but could, for example, assess groups or blocks of plural fragments e.g. to see if an alpha-test-edge may pass through the block of fragments (with all the fragments in the block then being re-issued for processing in a supersampled manner (or not) accordingly).

In this case, the sample positions at which individual alpha values are generated could, e.g., and preferably do, correspond to plural sample points for the block or groups of fragments as a whole (e.g. and preferably, to the corners of the block), but there may e.g., only be one (or indeed no) sample points in respect of a or any given individual fragments in the block. Such arrangements may be particularly suitable for rendering systems that render blocks of fragments, such as a 2×2 block of fragments, at a time.

In these embodiments and aspects of the present invention the alpha value comparisons (the alpha tests) can be used for any desired and suitable purpose.

In a particularly preferred embodiment, the comparison results are used, as discussed above, to assess whether an alpha test introduced edge is likely to pass through the fragment or fragments in question. This is preferably done by assessing whether some but not all of the sampling points pass the alpha test or not (since, as discussed above, if some sample points pass (would be kept) but some fail (would be discarded), that suggests an alpha-test-edge would be introduced). Most preferably, as discussed above, any fragment or group of fragments found to include an alpha-test-edge on this basis is re-issued for rendering in a fully supersampled manner.

The alpha-test arrangements of these aspects and embodiments of the arrangement could also or instead be used for other purposes. For example they could be used to retain or discard fragments or groups of fragments on the basis of the alpha-test results (comparisons), as discussed above.

Although the present invention has been described above with particular reference to the performance of alpha tests in graphic rendering, the Applicants have recognised that the principles and techniques of the present invention could also be applied to other situations and parameters, and not just alpha values, for example, and preferably, where the values of a particular parameter or parameters or attributes are not initially defined for particular sampling points or positions and/or where the defined values in respect of, for example, a given fragment, number less than the number of sample points that are to be considered in relation to the fragment.

This may be particularly the case, for example, where there are retain or discard tests carried out in respect of sample points, such as is the case for an alpha test, in graphics processing, and the initially defined graphics data (e.g. fragment attributes) for rendering do not give the exact values of the relevant parameter or parameters to be tested at the particular sample points in question.

For example, it may be that a retain or discard test is to be carried out in a fragment shader in relation to, for example, depth or stencil values for sampling points for fragments, but there is only a single depth or stencil value initially defined for the fragment. In this case, one could derive depth and/or stencil values for the particular sampling points in a similar manner to that discussed above for deriving alpha values, and then perform the depth or stencil test more accurately at each sampling point (and in an "anti-aliased" manner), in a similar manner to that discussed above in relation to the alpha test.

It is accordingly believed that the present invention can be applied to more than just the alpha test in graphics rendering systems.

Thus, according to another aspect of the present invention, there is provided a method of performing a parameter test in a graphics rendering system, the method comprising performing a parameter test for a fragment or fragments by:

generating an individual parameter value for a sampling point or sampling points for the fragment or fragments in question; and carrying out a parameter test for each sampling point individually, using the individual parameter value generated for the sampling point.

According to another aspect of the present invention, there is provided an apparatus for performing a parameter test in a graphics rendering system, the apparatus comprising:

means for generating an individual parameter value for a sampling point or sampling points for a fragment or fragments; and means for carrying out a parameter test for each sampling point individually, using the individual parameter value generated for the sampling point.

Similarly, according to a further aspect of the present invention, there is provided a method of processing a graphics primitive of an image to be displayed, the method comprising:

generating a set of graphics fragments for rendering the primitive for display;

rendering graphics fragments generated for the primitive to determine a set of rendered fragment data for each rendered graphics fragment;

generating during the rendering process an individual parameter value for a sampling point or sampling points for a fragment or fragments; and using the individual parameter value generated for a sampling point for subsequent processing in relation to the sampling point.

According to a further aspect of the present invention, there is provided a graphics processing system for processing a graphics primitive of an image to be displayed, the system comprising:

means for generating a set of graphics fragments for rendering the primitive for display;

means for rendering graphics fragments generated for the primitive to determine a set of rendered fragment data for each rendered graphics fragment;

means for generating during the rendering process an individual parameter value for a sampling point or sampling points for a fragment or fragments; and means for using the individual parameter value generated for a sampling point for subsequent processing in relation to the sampling point.

As will be appreciated by those skilled in the art, these aspects of the present invention can and preferably do include any one or more or all of the preferred and optional features of the present invention described herein. Thus, for example, the particular parameters and tests in question are preferably alpha, depth and/or stencil values and tests for the fragment(s) and at the sampling point(s). Similarly, the parameter test in question is preferably used to decide whether to retain or discard the sampling point in question.

Equally, the test that is carried out in relation to the derived parameter value at the individual sampling points preferably comprises comparing the individual parameter value or values generated for the sampling points individually with a respective reference parameter value or values.

It would also be possible in these arrangements to derive (and test) values for more than one parameter or attribute at each sampling point, such as deriving both depth and stencil values and then, e.g., performing comparison tests in respect of both parameters (attributes), etc., if desired.

Similarly, preferably an individual parameter value is generated for each of a plurality of sampling points, and/or covered sampling points, for the fragment or fragments in question. Similarly, the individual parameter values generated for the sampling points are preferably estimated in the manner discussed above (and, e.g., and preferably, generated using at least in part, the parameter value(s) initially defined for or allocated to the fragment in question and/or to plural of the fragments).

Similarly it is preferred that the sampling points for which individual parameter values are generated correspond to the sampling points used to determine the coverage of the primitive at the rasterisation stage (although this is not essential).

In general, these aspects and embodiments of the invention may, for example, be applied to any fragment attribute that might not have a known distribution function across a primitive (e.g. that can be arbitrarily manipulated by the graphics programmer with textures, etc.), since in that case the graphics processing system may not initially be able to derive exact values for the parameter at each sampling point. Similarly, it could be applied wherever a value of a given parameter or attribute is desired or required at a sample point, but the value at that sample point is not already defined.

Although the present invention has been described primarily with reference to the processing of a single graphics primitive, as will be appreciated by those skilled in the art, an image to be displayed will typically be made up of plural primitives and so in practice the method of the present invention will be repeated for each primitive making up the display, so that eventually an appropriate set of fragment data has been generated for each sampling point of the image that is needed to display the entire image (or relevant part of the image, e.g., in a tile-based rendering system), which data can then be, e.g., downsampled for display.

In a particularly preferred embodiment, the various functions of the present invention are carried out on a single graphics processing platform that generates and outputs the data that is written to the frame buffer for the display device.

The present invention is applicable to any form or configuration of renderer, such as renderers having a "pipelined" arrangement (in which case the renderer will be in the form of a rendering pipeline). In a preferred embodiment it is applied to a hardware graphics rendering pipeline. The various functions and elements, etc., of the present invention can be implemented as desired, for example, and preferably, by appropriate functional units, processing logic, processors, microprocessor arrangements, etc.

The present invention is applicable to all forms of rendering, such as immediate mode rendering, deferred mode rendering, tile-based rendering, etc., although it is particularly applicable to graphics renderers that use deferred mode rendering and in particular to tile-based renderers.

As will be appreciated from the above, the present invention is particularly, although not exclusively, applicable to 3D graphics processors and processing devices, and accordingly extends to a 3D graphics processor and a 3D graphics processing platform including the apparatus of or operated in accordance with any one or more of the aspects of the invention described herein. Subject to any hardware necessary to carry out the specific functions discussed above, such a 3D graphics processor can otherwise include any one or more or all of the usual functional units, etc., that 3D graphics processors include.

It will also be appreciated by those skilled in the art that all of the described aspects and embodiments of the present invention can, and preferably do, include, as appropriate, any one or more or all of the preferred and optional features described herein.

The methods in accordance with the present invention may be implemented at least partially using software e.g. computer programs. It will thus be seen that when viewed from further aspects the present invention provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processor may be a microprocessor system, a programmable FPGA (field programmable gate array), etc.

The invention also extends to a computer software carrier comprising such software which when used to operate a graphics processor, renderer or microprocessor system comprising data processing means causes in conjunction with said data processing means said processor, renderer or system to carry out the steps of the methods of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of preferred embodiments of the present invention will be described by way of example only and with reference to the accompanying drawings, in which.

A preferred embodiment of the present invention will now be described in the context of processing of 3D graphics for display. However, as will be appreciated by those skilled in the art, the present invention is not limited to the processing of 3D graphics and has other application as well.

As is known in the art, and as discussed above, when a 3D graphics image is to be displayed, it is usually first defined as a series of primitives (polygons), which primitives are then divided (rasterised) into graphics fragments for graphics rendering in turn. During a normal 3D graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output for display.

The present invention is particularly concerned with facilitating anti-aliasing operations when displaying graphics images. As is known in the art, anti-aliasing is carried out by taking plural samples of an image to be displayed and then downsampling those samples to the output resolution of the display.

Figure 1:
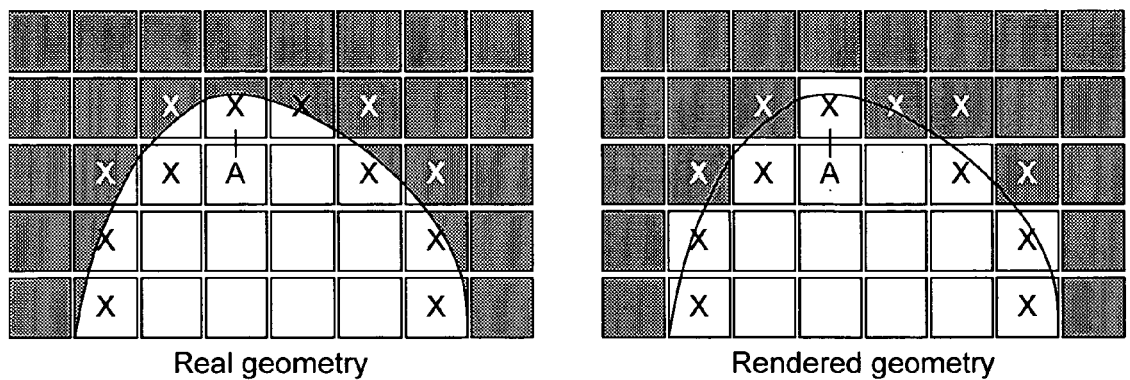
FIG. 1 shows schematically the effect of aliasing.
Figure 2:
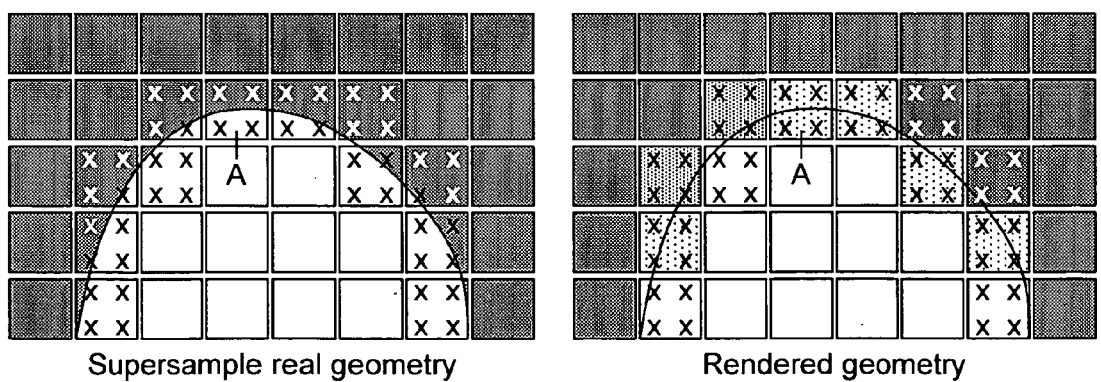
FIG. 2 shows schematically the supersampling anti-aliasing technique.
Figure 3:
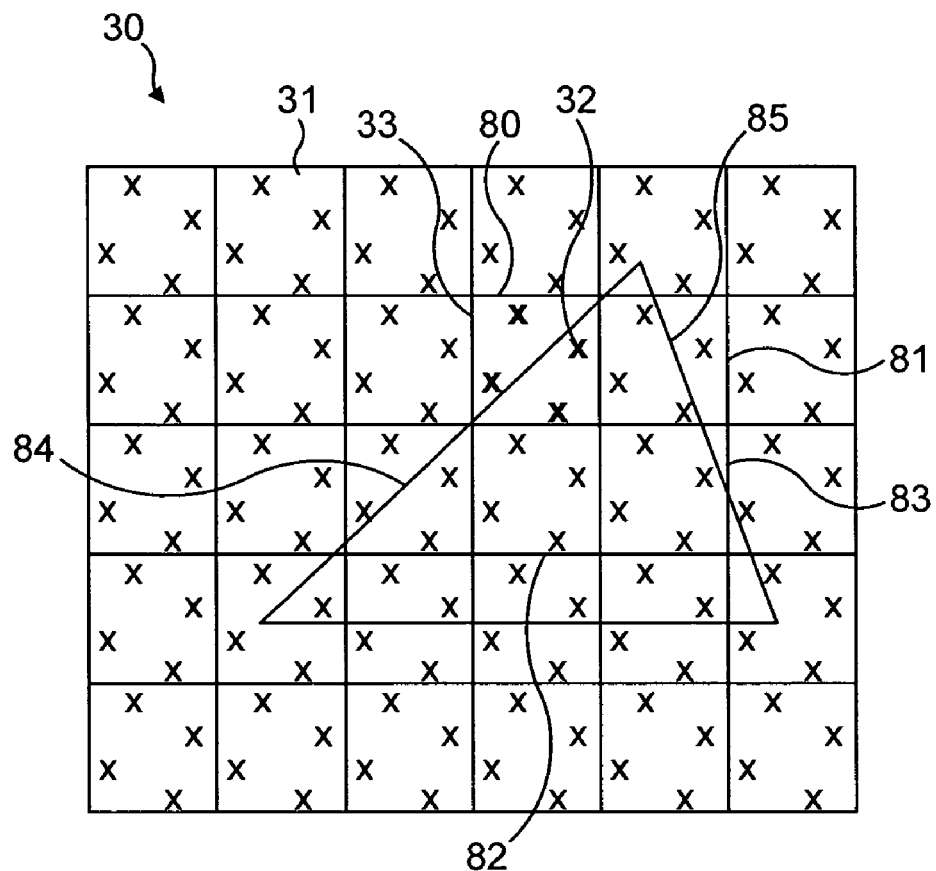
FIG. 3 shows schematically an image to be displayed.

FIG. 3 shows schematically the basic anti-aliasing arrangement that is used in the present embodiment. FIG. 3 shows schematically an array of pixels 30 that in the present embodiment represents a part of the image to be displayed (since, as will be discussed further below, the present embodiment is a tile-based rendering system) (although equally the set of pixels could be considered to represent the entire display of the image). Each pixel includes, as shown in FIG. 3, a set of four sampling points 31 that will be used to sample the image for the pixel in question and accordingly determine how the pixel is to be displayed on the final display.

Figure 4:
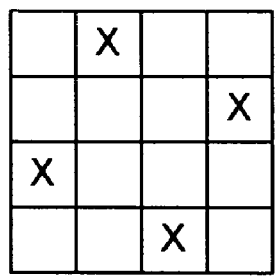
FIG. 4 shows an exemplary sampling pattern for use in an embodiment of the present invention.

As shown in FIG. 3, the same sampling pattern 31 is used for each pixel in the pixel array 30. In this embodiment, the sampling pattern is a rotated grid sampling pattern, although any other suitable anti-aliasing sampling pattern could be used if desired. FIG. 4 shows an expanded view of a single pixel showing the location of the sampling points in the sampling pattern within the pixel.

FIG. 3 also shows an image overlaid on the pixel array 30 in the form of a single primitive 32. (It will be appreciated here that the image has been shown in FIG. 3 as comprising a single primitive for simplicity, and in practice the image may and typically will comprise many, overlapping, primitives, as is known in the art.) As can be seen from FIG. 3, the primitive 32 overlies some of the pixels in the pixel array 30 completely, but only passes through part of some of the other pixels.

To process the primitive 32 of the image, the rendering system will, in essence, determine at the rasterisation stage which of the sample points in each set of sample points of each pixel are covered by the primitive 32, and then render and store data for those covered sample points so that the image of the primitive 32 can be properly displayed on the display device.

The processing of the image of the primitive 32 for display in this manner in the present embodiment will now be described with reference to FIG. 5 which shows schematically an embodiment of a 3D graphics processing platform that can be operated in accordance with the present invention. The 3D graphics processing platform shown in FIG. 5 is a tile-based renderer, although as will be appreciated by those skilled in the art, other rendering arrangements can be used (and indeed, the present invention is equally applicable to two dimensional graphics processing as well).

Figure 5:
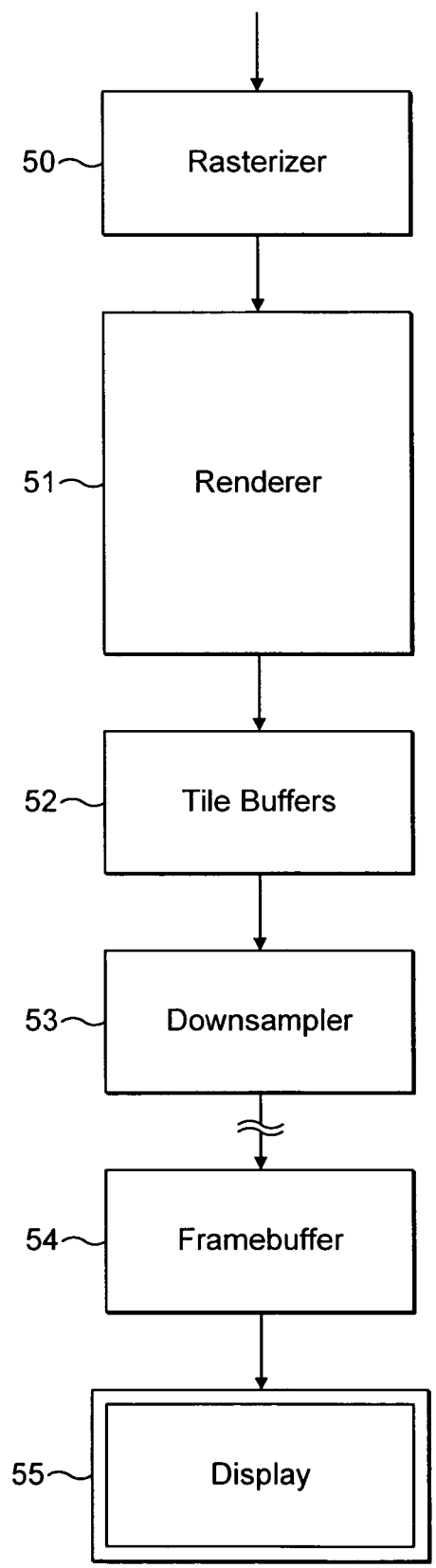
FIG. 5 shows an embodiment of a graphics processing platform that can be operated in accordance with the present invention.

The graphics processing platform shown in FIG. 5 includes a rasteriser 50 that receives graphics primitives for rendering and converts the primitive data to graphics fragments having appropriate positions for rendering the primitives.

There is then a renderer 51 in the form of a rendering pipeline that receives graphics fragments for rendering from the rasteriser 50 and applies a number of rendering operations, such as texture mapping, fogging, blending, etc., to those graphics fragments to generate the appropriate fragment data for display of the fragments. The rendered fragment data from the renderer 51 is stored in tile buffers 52 of the rendering pipeline for subsequent processing.

The tile buffers 52 store, as is known in the art, an array of fragment data that represents part of the image to be displayed. Once each tile has been processed, its data is exported to an appropriate storage, and the next tile is then processed, and so on, until sufficient tiles have been processed to display the entire image.

In the present embodiment, four tile buffers 52 are provided. Each tile buffer stores its fragment data in a 32×32 array (i.e. corresponding to a 32×32 array of sample positions in the image to be displayed). These tile buffers may be provided as separate buffers, or may in fact all be part of the same, larger buffer. They are located on (local to) the graphics processing platform (chip).

The data from the tile buffers 52 is input to a downsampling unit 53, and thence output to a frame buffer 54 (that may not be on the graphics processing platform itself) of a display device 55 for display on the display device 55, as is known in the art. The display device 55 could comprise, e.g., a display comprising an array of pixels, such as a computer monitor.

The downsampling unit 53 downsamples the fragment data stored in the tile buffers to the appropriate resolution for the display device 55 (i.e. such that an array of pixel data corresponding to the pixels of the display device is generated).

In the present embodiment, the sampling points of the image have their own individual fragment data entries in the tile buffers 32. Thus, each 32×32 data position tile buffer will, for example, correspond to a 16×16 pixel array in the image to be displayed where 4× downsampling is used between the tile buffers and the display frame buffer (because in that case each pixel will effectively have four sampling points associated with it).

In this embodiment, two of the four tile buffers are used to store colour (red, green, blue) values for each sampling point (it would be possible to use one tile buffer for this purpose, but two are preferred), one tile buffer is used to store Z (depth) values for each sampling point, and one is used to store stencil values for each sampling point. Other arrangements would, of course, be possible.

Although the sampling points each have their own individual fragment data entry in the tile buffers 52, in the present embodiment, rather than rendering a separate fragment for each individual sample (data) position in the tile buffers 52 (i.e. for each individual sample point), one fragment is rendered for each set of four sample points corresponding to a given pixel in the image. In other words, a single fragment is used to render all four sample points of a set of sample points (and accordingly of a pixel in the image) together in one go, i.e. such that the sample points for a given pixel are all rendered in common. Then, once the fragment has been rendered, the rendered fragment data is stored in multiple copies in the appropriate sample positions in the tile buffers 52, so as to provide a separate set of fragment data for each individual sample position taken of the image.

Thus, in the present example, considering the image comprising the primitive 32 shown in FIG. 3, the rasteriser 50 will receive that primitive from the graphics processing system, and then determine which sets of sampling points of the image (i.e. in effect which pixels in the pixel array 30) include sampling points that are covered by the primitive 32. (This may be carried out in any appropriate manner known in the art.) The rasteriser 50 will then generate a fragment for each set of sampling points found to include a sampling point that is covered by the primitive 32. It will then pass those fragments to the renderer 51 for rendering.

Figure 7:
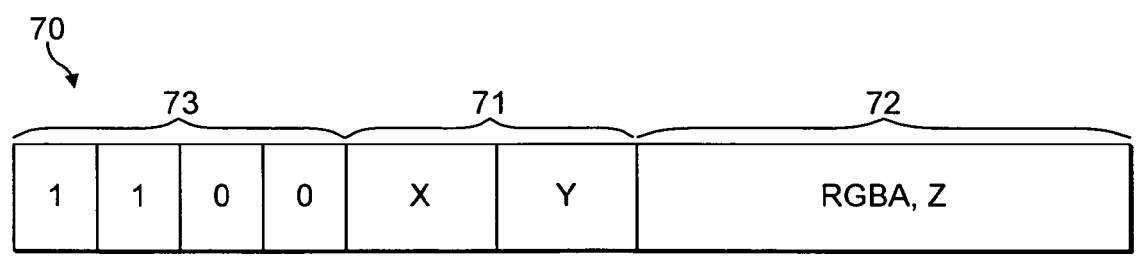
FIG. 7 illustrates the data that is associated with a fragment to be rendered in an embodiment of the present invention.

FIG. 7 shows schematically the data 70 that is generated for each fragment before it is rendered and that passes through the renderer 51. As shown in FIG. 7, the data that is associated with each fragment includes, inter alia, the x,y position 71 of the fragment (which represents the x,y position in the image of the set of sampling points that the fragment corresponds to (in practice in the present embodiment of the relevant pixel in the image)), together with the necessary per fragment data 72, such as the colour (RGB), transparency (alpha), depth (z) and stencil values for the fragment. This per fragment data 72 is, as is known in the art, used by and appropriately modified by rendering units of the renderer 51 to provide the output set of fragment data for the fragment that is then stored in the tile buffers 52.

The data 70 that is associated with the fragment also includes a coverage mask 73 that is in the form of a bit array representing each of the sample positions within the set of sample points that the fragment corresponds to. Each position in the bit array coverage mask 73 is set to "1" if the corresponding sample position is found to be covered by the primitive in question at the rasterisation stage, and to "0" if the sample position is not covered by the primitive in question. This allows the rendering process to know which of the sample points associated with a given fragment are in fact covered by the primitive 32 in question, so that the rendering process can ensure that the rendered fragment data for a fragment is only used (and, e.g. stored) for the sample points that are covered by the primitive.

Figure 6:
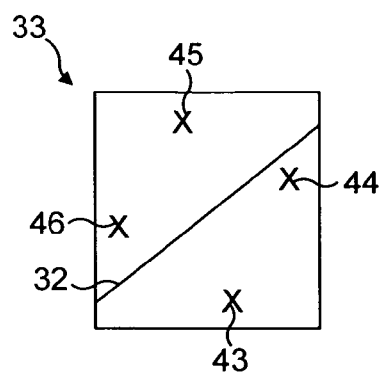
FIG. 6 shows an enlarged view of a pixel of FIG. 3.

This is necessary, because, as can be seen from FIG. 3, not all the sampling points of a set of sampling points for a pixel will necessarily be covered by a primitive. For example, as illustrated in FIG. 6, which shows an enlarged view of the set of sampling points for the pixel 33 in FIG. 3 in relation to a primitive 32 to be rendered, it can be seen that of the set of sampling points for the pixel 33, the sampling points 43 and 44 are covered by the primitive 32, but the sampling points 45 and 46 are not covered by that primitive. The rasteriser 50 will therefore generate a fragment for rendering for the set of sample positions for pixel 33, since that set of sample positions includes two sample positions, 43, 44, that are covered by the primitive 32. However, because the primitive 32 only covers the sample positions 43, 44, the rendered fragment data should only be stored in the tile buffer 52 for those sample positions and not for the samples positions 45 and 46.

Therefore, for the set of sample positions for the pixel 33 shown in FIG. 6, the rasteriser will generate a coverage mask 73 of the form "1100" (as shown in FIG. 7), to indicate that the sample positions 43 and 44 are being rendered by the fragment 70, but that the sample positions 45 and 46 are not being rendered by the fragment (since they are not covered by the primitive 32).

Thus, when the rasteriser 50 receives the primitive 32 for rendering, it will firstly determine which sets of sampling points (pixels) of the array 30 include sampling points that are covered by the primitive 32, and for each of those sets of sampling points generate a fragment having associated with it data of the form shown in FIG. 7.

Each fragment will then be passed in turn to the renderer 51 for rendering. In the present embodiment, the fragments are sent to the renderer 51 for rendering in blocks of 2×2 fragments, i.e. such that the rendering engine effectively processes fragments (pixels) in 4 fragment (pixel) blocks, 2 pixels wide by 2 pixels tall). Other arrangements, such as processing fragments (pixels) singly in the renderer, would, of course, be possible.

The renderer 51 will, as is known in the art, carry out rendering operations on the fragments that it receives. These rendering operations will, for example, include modifying the colour (RGB) and transparency (A) values of the fragments to provide final, rendered fragment data for each fragment. In the present embodiment, the renderer 51 includes a texture mapping stage that carries out a texture mapping process based on texture position data (s,t) that is associated with each fragment (this is not shown in FIG. 7).

In the present embodiment, the position within the image that the texture mapping process uses to determine the texture (colour) that will be applied to a fragment is selected in accordance with the locations (positions) in the image of the covered sampling points that the fragment is being used to render in common, i.e. a "weighted" texture sample position is used.

Other texture sample position arrangements would, of course, be possible. For example, all texture look-ups could simply be taken at the centre of the sampling pattern in question.

It will be appreciated here that because each fragment undergoes a single texture look-up, the set of sampling points that each fragment corresponds to undergo a single texture look-up in common (i.e. the texturing operation is used for all the sample points of the set of sampling points associated with the fragment), i.e. the set of sampling points is effectively processed in a multisampled manner.

Another part of the rendering process of present embodiment is that an alpha-test is carried out in respect of each fragment being rendered. As is known in the art, the alpha-test normally comprises comparing an alpha value defined for a fragment with a reference or threshold alpha value defined for the alpha-test, and then either keeping or discarding the fragment on the basis of the comparison.

In the present embodiment, the alpha test process is modified, in accordance with the present invention, so as to provide, as discussed herein, an "anti-aliased" alpha-test process, notwithstanding the fact that each fragment may only initially have a single alpha-value defined for it, as discussed above.

FIGS. 8, 9, 10 and 11 illustrate the alpha-test process of the present embodiment.

Figure 8:
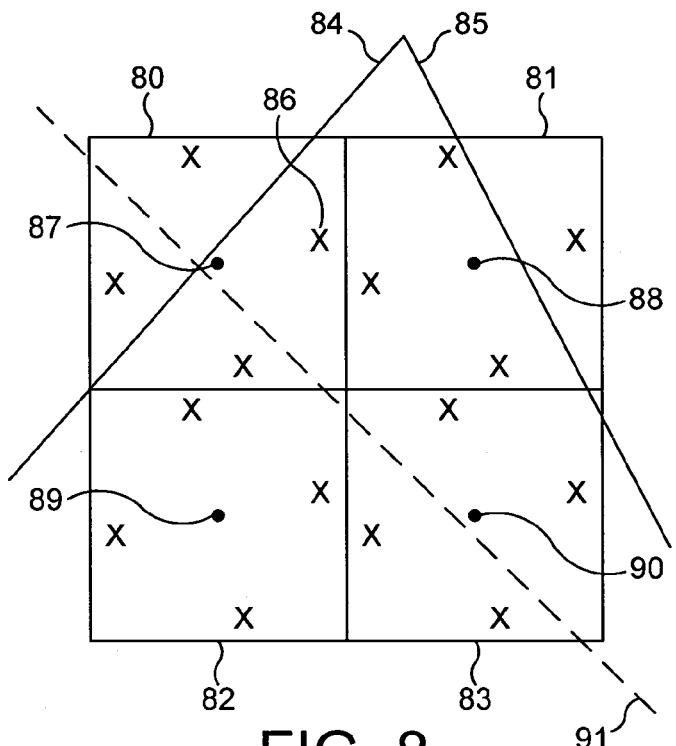
FIGS. 8 and 11 show schematically an embodiment of a alpha testing arrangement that is in accordance with the present invention.

FIG. 8 shows schematically a 2×2 block of pixels 80, 81, 82, 83, corresponding to the pixels 80, 81, 82 and 83 from FIG. 3. The lines 84 and 85 in FIG. 8 correspond to the edges of the primitive 84, 85, as illustrated in FIG. 3. FIG. 8 also shows the respective sampling points for each of the pixels 80, 81, 82 and 83. The centre points 87, 88, 89, 90 for each fragment are also denoted in FIG. 8.

As discussed above, at the initial rasterisation stage, the geometric edges 84, 85 of the primitive are tested against the sampling points for each of the pixels 80, 81, 82 and 83, so as to determine which sampling points for each pixel are covered by the primitive. There is then generated a set of fragments, each fragment corresponding to a given pixel in the display, and defining appropriate data for the pixel and also indicating which sampling positions for the respective pixel the primitive covers.

Figure 9:
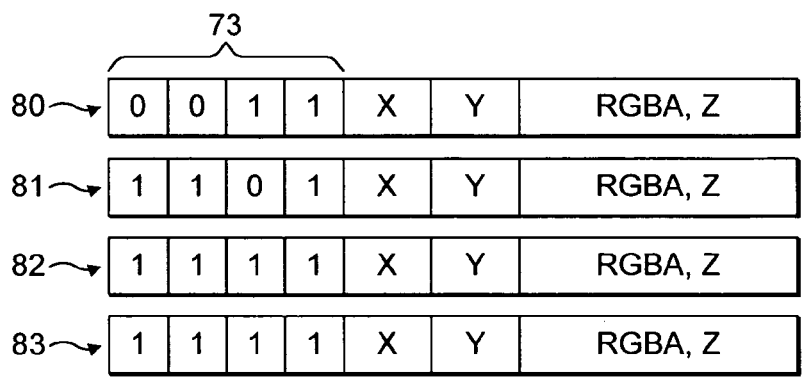
FIGS. 9 and 10 show schematically the data that is associated with fragments and modified as a result of the alpha test in the described embodiment of the present invention.

Thus, in the present case, a set of fragments 80, 81, 82 and 83, as show schematically in FIG. 9, will be generated for the 2×2 block of pixels 80, 81, 82 and 83 at the rasterisation stage.

As shown in FIG. 9, the coverage mask 73 for the fragment 80 shows that two sampling positions of the pixel to which the fragment 80 corresponds are covered by the primitive, the coverage mask 73 for the fragment 81 shows that three sampling positions of that pixel are covered, and so on.

As also shown in FIG. 9, each respective fragment 80, 81, 82 and 83 has a single transparency (alpha) value initially defined for it. This value is derived in the present embodiment from the alpha values defined for the vertices of the primitive, but can be done in any suitable manner known in the art.

In the present example, it is assumed that the transparency (alpha) value for the fragment 80 is 0.3, for the fragment 81 is 1.0, for the fragment 82 is 0.0 and for the fragment 83 is 0.3. These values are, of course, illustrative only.

In the normal course, these alpha values defined for each fragment would be used, as discussed above, for comparison purposes with a reference alpha value defined for the alpha test, to either keep or discard the fragment (and thus the pixel to which the fragment corresponds) as a whole on the basis of the alpha test.

However, in the present embodiment, and in accordance with the present invention, when the alpha test is performed, rather than simply taking the alpha value initially defined for each fragment to perform the alpha test, instead an individual alpha value is generated in respect of each of covered sampling position that the fragment in question is being used to render. Then, an alpha test in respect of the individual sampling positions is carried out.

This process will be illustrated with respect to the derivation of the alpha value for the sampling point 86 of the fragment 80. The same process is applied in respect of each individual sampling point that is covered by the primitive for the fragments in question In order to generate an individual alpha value for the sampling point 86 of the fragment 80, firstly the single alpha value 0.3 initially defined for the fragment 80 is taken as being the alpha value at the centre 87 of the fragment 80.

Then, the difference between the alpha value at the sampling point 86 and the centre 87 of the fragment 80 is estimated. This is done by estimating the slope (derivative) of the alpha values with respect to screen X, Y location (which slope can then be used to derive the relative change in alpha value from the centre 87 to the sampling point 86 using the known relative screen X, Y distance between the sampling point 86 and the centre 87 of the fragment 80).

The slope (rate of change) of the alpha value with respect to position is determined in the present embodiment by deriving the slope of the alpha value in the X direction by determining the difference between the alpha value at the centre 87 of the fragment 80 and the alpha value at the centre 88 of the fragment 81 (which is taken to the alpha value 1.0 defined for the fragment 81) and the known screen distance in X between the centres 87 and 88.

Similarly, the slope (rate of change) of the alpha value in the Y direction for the fragment 80 is determined by discerning the difference between the alpha value at the centre 87 of the fragment 80 and the alpha value at the centre 89 (which is taken to be the alpha value 0.0 defined for the fragment 82) of the fragment 82, and the Y distance between the fragment centres.

These generated X and Y derivatives (rates of change) are then multiplied by the screen space X and Y distances between the centre 87 of the fragment 80 and the sampling point 86, to give the change in alpha value from the centre 87 to the sampling position 86. This estimated change in alpha value is then added to the alpha value for the centre point 87 for the fragment 80 (i.e. the alpha value initially defined for the fragment 80 in the present embodiment), thereby to derive an estimate of the "true" alpha value at the sample position 86.

This process is then repeated for each of the remaining covered sample positions for the fragment 80, and similarly for the covered sample positions of the other fragments (albeit in this case using the respective initially defined alpha values for the fragments as the alpha values at the centre points of the other fragments: thus, for example, in the case of the fragment 81, the alpha value at the centre 88 of that fragment is taken to be the initially defined alpha value, 1.0, for the fragment 81).

Figure 11:
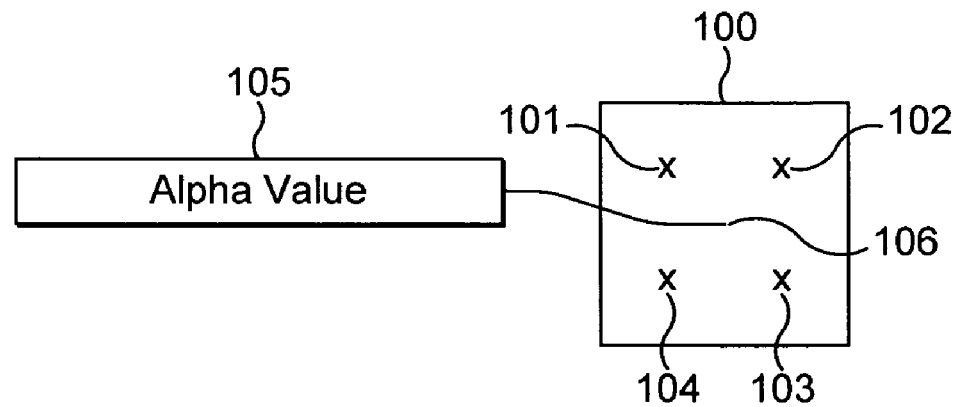
Figure 11:
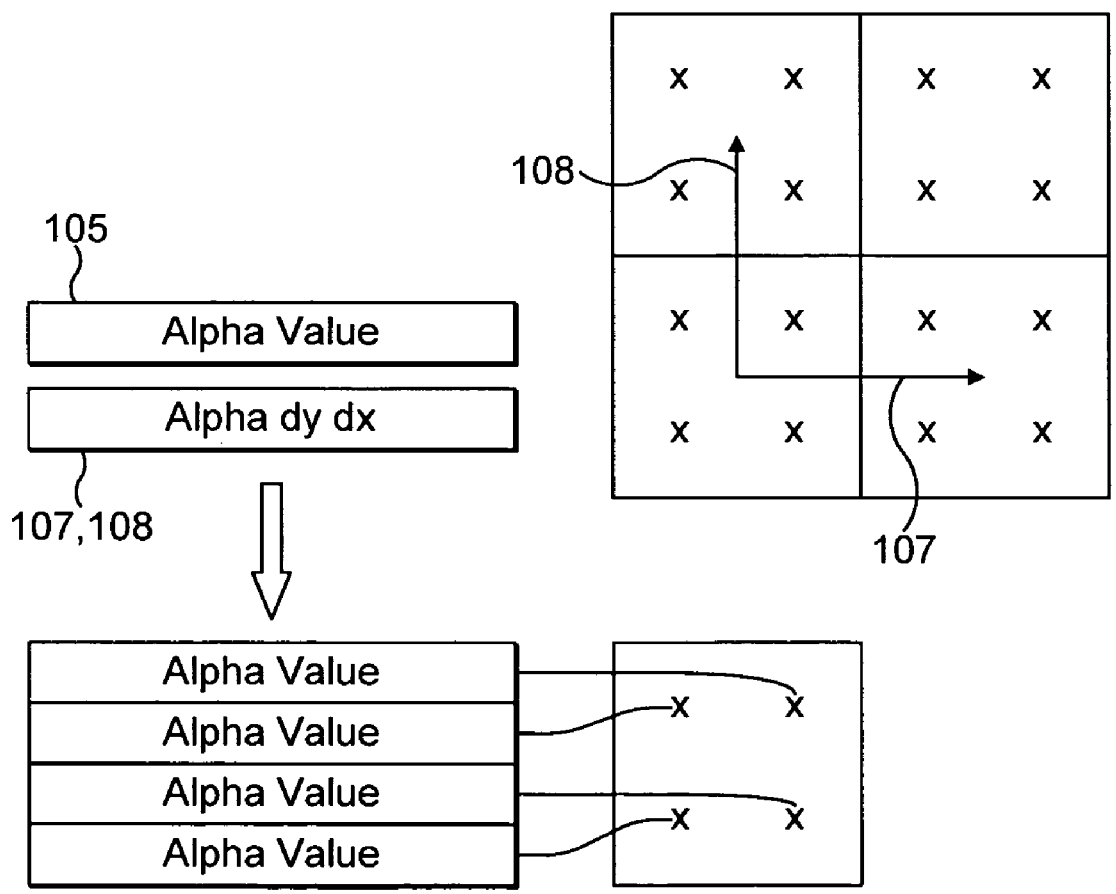

FIG. 11 further illustrates the alpha value derivation process. As shown in FIG. 11, for a given fragment 100, having sampling positions 101, 102, 103, 104, the alpha value 105 initially defined for the fragment is taken as the alpha value at the centre 106 of the fragment, fragment gradients (deltas) 107, 108 are derived in the x and y directions, and then used with the centre point alpha value 105 to give the alpha value at each respective sampling point.

Other arrangements for deriving and estimating the alpha values of each covered sample position could be used, if desired.

For example, rather than using the gradients (rates of change) in X and Y derived for the fragment 80 for each of the other fragments 81, 82 and 83 of the 2×2 block of fragments when estimating the alpha values, a new set of gradient (rate of change) values could be generated in a similar way for each fragment individually.

Thus, for example, in the case of the fragment 81, the X gradient could be derived by considering the alpha values at the centre 87 of the fragment 80 and at the centre 88 of the fragment 81, and the Y gradient could be derived by considering the alpha value at the centre 88 of the fragment 81 and at the centre 90 of the fragment 83.

It would also, for example, be possible to use the alpha values at the centre 88 of the fragment 81 and at the centre 90 of the fragment 83 to derive the Y gradient for the fragment 80, and so on. Similarly, alpha values for fragments spaced further apart than those shown in FIG. 8 could be used, if desired, to derive the alpha gradients.

In general any suitable and desired technique for deriving the gradients (rate of change) of the alpha values with respect to screen space X and Y distances could be used. More sophisticated techniques may provide more accurate estimates of the alpha values at the sample points, but on the other hand may require greater processing work load.

The individual alpha values estimated for each sample position are then used for the alpha test comparison, i.e. they are compared with the threshold alpha value defined for the alpha test. Thus, for example, in the case of the sample position 86, the alpha value estimated for that sample position is then compared with the reference alpha value defined for the alpha test. This is then repeated in respect of each covered sampling position separately.

The result of the alpha test comparison for an individual sample point is then used to either keep or discard the sample position from further processing on the basis of the alpha test comparison. This is done by modifying the coverage mask 73 associated with the fragment in question to exclude any covered sampling points that are in fact found to be discarded as a result of the alpha test.

Figure 10:
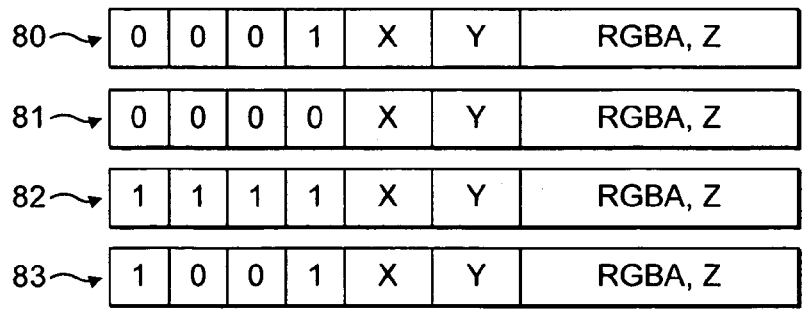

This process is illustrated in FIG. 10, which shows the resultant fragment data sets for the fragments 80, 81, 82 and 83 shown in FIG. 9 after the performance of the alpha test, on the assumption that the alpha test comparison results in a line (effectively an alpha-test introduced edge) 91, above which samples are found to be discarded as a result of the alpha test in the present example, but below which they are retained.

The consequence of this alpha test and the alpha threshold value that results in the alpha test introduced edge 91 is, as shown in FIG. 9, that the coverage mask for the fragment 80 is modified to show that the sampling point 86 is excluded from further processing (i.e. has failed the alpha test), by changing the coverage mask bit for that sample position from "1" to "0". Similarly, in respect of the fragment 81, the coverage mask for that fragment is now set to "0000", because the alpha test has discarded all of the sample positions of that fragment that were covered by the primitive. In the case of the fragment 83, two sample positions are discarded by the alpha test, and so the coverage mask for that fragment becomes "1001".

In this way, an individual alpha test is performed for each respective covered sampling position, not withstanding the fact that there may only be a single initial alpha value defined for the set of four sampling positions for a pixel as a whole, and sampling positions can then be retained or discarded on an individual basis as a result of the alpha test. The effect of this then is that any edges introduced by the alpha test are effectively "anti-aliased" (since they are processed at the level of the sampling positions in terms of their position).

Once the fragments have been rendered, their data needs to be stored appropriately in the tile buffers 52. In accordance with the present embodiment, the data for each rendered fragment is stored in the appropriate sample position(s) in the tile buffer array as indicated by the coverage mask 73 associated with each fragment. Thus, in the case of the fragment 70 exemplified in FIG. 7, for example, the rendered data for that fragment will be stored in two of the sample positions in the tile buffers 52, but not in the other two sample positions, that are associated with the fragment 70.

The fragment data that is stored in the tile buffers 52 comprises the colour (RGB), transparency (A), depth (Z) and stencil values for each sample position, as discussed above. This data can be stored in any suitable form.

As will be appreciated by those skilled in the art, the newly rendered fragment data that is to be stored in the tile buffers may and typically will need to be blended with data that is already stored in the tile buffers, as is known in the art. Thus, where a given fragment is being used to render more than one sample position in common (i.e. such that data from the fragment will be stored in plural sample positions in the tile buffers), then this blending operation should be carried out in an appropriate manner to achieve this, i.e. to blend the newly rendered fragment data appropriately into each appropriate sample position in the tile buffers. Thus, for example, the blending operation could, for example, be carried out in an appropriately "parallel" fashion, to blend the rendered fragment data into the plural, parallel, tile buffers.

Once this process has been completed for all the fragments relating to the primitive 32, it can then be repeated for subsequent primitives of the image (since, as discussed above, the image will typically be made up of plural primitives, and not just a single primitive 32). The process is repeated for all the primitives of the image, until the tile buffers 52 have the appropriate data stored in each of their sample positions.

The data stored in the tile buffers can then be exported to the downsampling unit 53 for downsampling and subsequent exporting to the frame buffer 54 for display, as is known in the art. This downsampling can take place in any suitable manner. In the present embodiment linear blending of the data is used to downsample it. However, other arrangements would be possible, if desired.

Where the image to be displayed comprises plural, overlapping primitives, it will also, as is known in the art, be necessary for the rendering process to determine whether in fact any given primitive will actually be seen at a given sampling point. In the present embodiment this is carried out, as is known in the art, by comparing depth (z) values for fragments as they are rendered. In particular, when a new fragment is to be rendered, the depth (z) value associated with that fragment is compared with the depth values of fragment data already stored for the sample positions in the tile buffers 52 that the fragment corresponds to, and if that comparison indicates that the new fragment will not be seen, the new fragment is not processed any further. On the other hand, if the comparison of the depth values indicates that in fact the new fragment will be seen in place of the currently stored fragment in the tile buffers 52, then the new fragment is rendered and its rendered fragment data stored in place of the existing data for the appropriate sample positions in the tile buffers 52.

The downsampling unit 53 also applies appropriate gamma correction to the data that it outputs to the frame buffer 54.

Other arrangements of and modifications to the present invention and the present embodiment would, of course, be possible. For example, more than four sample locations for the alpha test and/or alpha value estimations could be used per fragment or pixel.

It would also be possible to use the estimated alpha tests in the present embodiment to assess whether an alpha-test introduced edge is likely to pass through a fragment or a block of fragments. For example, in the arrangement shown in FIG. 8, the results of the alpha test comparison in respect of the fragment 83, for example, show that two samples positions are retained, but two are discarded. That would then be an indication that an edge introduced by the alpha test will pass through that fragment. It will also be possible in respect of this kind of test to perform the test in respect of the corners of fragments, rather than, for example, using the same sample positions as are used for rasterisation of the primitive's outer geometric edges.

In such an arrangement, if it is found that a fragment or block of fragments is likely to contain an alpha-test introduced edge, then in a preferred embodiment, the fragment or block of fragments in question is preferably re-issued for rendering but on a fully supersampled basis (in other words such that each sample position is processed as a separate fragment, and accordingly obtains its own, individual colour and alpha, etc., values).

As can be seen from the above, the present invention, in its preferred embodiments at least, provides a system in which edges introduced by an alpha test can be anti-aliased, but without the need to process primitives to be rendered in a fully supersampled manner. For example, unlike fully supersampling methods, the method of the present invention does not require multiple colour values to be computed per pixel or fragment for an anti-aliased alpha test arrangement. This means, for example, that the present invention facilitates a reduction of calculations in processing, with attendant power saving, as compared to a fully supersampled system.

This is achieved in the preferred embodiments of the present invention at least by using the single alpha values initially defined for each fragment to be rendered to recreate individual alpha values for plural individual sampling points in respect of fragments to be rendered, and then performing the alpha test in respect of those individual sampling points individually.

As discussed above, although the present invention and the present embodiment has been described with particular reference to the alpha test in graphics processing systems, the present invention can equally be applied to other situations where it is desired to know attribute or parameter values at particular sample points and those values are not already defined. Thus it may, for example, in particular be used for depth and/or stencil testing operations in a graphics processing system, such as in a fragment shader. In these cases the methods and techniques described above in relation to alpha testing can analogously be applied in respect of the particular parameter or parameters in question.

The invention claimed is:

1. A method of performing an alpha test in a graphics rendering system, the method comprising performing an alpha test for a fragment or fragments by:
   generating, by a data processor, an individual alpha value for a sampling point or sampling points for the fragment;
   carrying out, by the data processor, an alpha test for each sampling point individually using the individual alpha value generated for the sampling point.

2. The method of claim 1, wherein the sampling points for which individual alpha values are generated correspond to the sampling points used to determine the coverage of the primitive at the rasterisation stage.

3. The method of claim 1, wherein the sampling points are for a group of plural fragments.

4. The method of claim 1, comprising generating the individual alpha values for the sampling points by estimating the alpha value at each sampling point from an alpha value associated with the fragment.

5. The method of claim 1, comprising using the alpha tests on the individual sample positions to assess whether an alpha-test introduced edge could pass through the fragment or fragments in question.

6. The method in claim 1, further comprising:
   performing a rendering process on the fragment,
   wherein the alpha test is part of the rendering process.

7. A computer implemented method of processing a graphics primitive of an image to be displayed, the computer implemented method comprising:
   generating, by a computer, a set of graphics fragments for rendering the primitive for display;
   rendering, by the computer, graphics fragments generated for the primitive to determine a set of rendered fragment data for each rendered graphics fragment; and
   performing, by the computer, an alpha test in respect of a fragment as part of the rendering process; wherein:
   the alpha test is performed by:
   generating an individual alpha value for a sampling point or sampling points for the fragment; and
   carrying out an alpha test individually for each sampling point for which an alpha value has been generated using the individual alpha value generated for the sampling point.

8. The method of claim 7, comprising generating the alpha values for the sampling points using an alpha value defined for the fragment in question and the alpha value or values defined for one or more neighboring fragments of the fragment.

9. The method of claim 7, wherein the comparison of the alpha values is used to decide whether to discard the sampling point.

10. The method of claim 7, comprising associating with each fragment data indicating which sampling points the fragment is being used to render, and using the alpha-test results to modify this data to indicate sample positions that are to be discarded as a result of the alpha tests.

11. A computer program product comprising computer instructions stored on a non-transitory, computer-readable storage medium which when executed by a computer cause the computer to carry out the method of claim 7.

12. A method of performing a parameter test in a graphics rendering system, the method comprising performing a parameter test for a fragment by:
   generating, by a graphics processor, an individual parameter value for a sampling point or sampling points for the fragment; and
   carrying out, by the graphics processor, a parameter test for each sampling point individually using the individual parameter value generated for the sampling point.

13. A method of processing a graphics primitive of an image to be displayed, the method comprising:
   generating, by a graphics processor, a set of graphics fragments for rendering the primitive for display;
   rendering, by the graphics processor, graphics fragments generated for the primitive to determine a set of rendered fragment data for each rendered graphics fragment;
   generating, by the graphics processor, an individual parameter value for a sampling point or sampling points for a fragment; and
   using the individual parameter value generated for a sampling point for subsequent processing in relation to the sampling point.

14. A system for performing an alpha test in a graphics rendering system, the system comprising:
   processing logic circuitry configured to generate an individual alpha value for a sampling point or sampling points for a fragment or group of fragments that is to undergo an alpha test; and
   processing logic circuitry configured to carry out an alpha test for each sampling point individually using the individual alpha value generated for the sampling point.

15. The system of claim 14, wherein the sampling points for which individual alpha values are generated correspond to the sampling points used to determine the coverage of the primitive at the rasterisation stage.

16. The system of claim 14, wherein the sampling points are for a group of plural fragments.

17. The system of claim 14, comprising processing logic circuitry configured to generate the individual alpha values for the sampling points by estimating the alpha value at each sampling point from an alpha value associated with the fragment in question.

18. The system of claim 14, comprising means for using the alpha tests on the individual sample positions to assess whether an alpha-test introduced edge could pass through the fragment or fragments in question.

19. A system for processing a graphics primitive of an image to be displayed, the system comprising:
   means for generating a set of graphics fragments for rendering the primitive for display;
   means for rendering graphics fragments generated for the primitive to determine a set of rendered fragment data for each rendered graphics fragment; and
   means for performing an alpha test in respect of a fragment or fragments as part of the rendering process; wherein:
   the means for performing the alpha test comprises:
   means for generating an individual alpha value for a sampling point or sampling points for the fragment or fragments in question; and
   means for carrying out an alpha test for each sampling point individually using the individual alpha value generated for the sampling point.

20. The system of claim 19, comprising means for generating the alpha values for the sampling points using an alpha value defined for the fragment in question and the alpha value or values defined for one or more neighbouring fragments of the fragment in question.

21. The system of claim 19, wherein the comparison of the alpha values is used to decide whether to discard the sampling point.

22. The system of claim 19, comprising processing logic operable to associate with each fragment data indicating which sampling points the fragment is being used to render, and processing logic operable to use the alpha-test results to modify this data to indicate sample positions that are to be discarded as a result of the alpha tests.

23. An apparatus for performing a parameter test in a graphics rendering system, the apparatus comprising:
   means for generating an individual parameter value for a sampling point or sampling points for a fragment;
   means for carrying out a parameter test for each sampling point individually using the individual parameter value generated for the sampling point.

24. A graphics processing system for processing a graphics primitive of an image to be displayed, the system comprising:
   processing logic circuitry configured to generate a set of graphics fragments for rendering the primitive for display;
   processing logic circuitry configured to render graphics fragments generated for the primitive to determine a set of rendered fragment data for each rendered graphics fragment;
   processing logic circuitry configured to generate an individual parameter value for a sampling point or sampling points for a fragment or fragments; and
   processing logic circuitry configured to use the individual parameter value generated for a sampling point for subsequent processing in relation to the sampling point.

* * * * *